United States Patent
Trinidad et al.

(10) Patent No.: US 10,060,037 B2
(45) Date of Patent: Aug. 28, 2018

(54) METHOD FOR PRESERVING A MARK ON A METALLIC WORKPIECE

(71) Applicant: ECORENEW DMCC, Dubai (AE)

(72) Inventors: Reybert L. Trinidad, Muntinlupa (PH); Jose Mari I. Omni-On, Lawa Calamba (PH); Orville T. Padaon, Laguna (PH)

( * ) Notice: Subject to any disclaimer, the term of this patent is extended or adjusted under 35 U.S.C. 154(b) by 60 days.

(21) Appl. No.: 15/137,935

(22) Filed: Apr. 25, 2016

(65) Prior Publication Data
US 2017/0107628 A1   Apr. 20, 2017

(30) Foreign Application Priority Data
Oct. 20, 2015   (GB) .................................. 1518499.7

(51) Int. Cl.
*B44C 1/22*    (2006.01)
*C23F 1/32*    (2006.01)
(Continued)

(52) U.S. Cl.
CPC ............ *C23F 1/32* (2013.01); *B23K 26/0006* (2013.01); *B23K 26/0084* (2013.01);
(Continued)

(58) Field of Classification Search
CPC ... C23F 1/32; C23F 1/20; B44C 1/227; B44C 3/005; B05D 2202/00; C25D 5/02; C25D 11/12; C25D 11/022
(Continued)

(56) References Cited

U.S. PATENT DOCUMENTS 5,843,250 A  * 12/1998 Bone ....................... B41C 1/025
                                                                  156/58
6,476,409 B2 * 11/2002 Iwasaki .................. B82Y 10/00
                                                                  257/13
(Continued)

FOREIGN PATENT DOCUMENTS

CN          202084007 U     12/2012
GB             501836 A      3/1939
(Continued)

OTHER PUBLICATIONS

Wikipeida, "Aluminum oxide" via https://web.archive.org/web/20140603155830/https://en.wikipedia.org/wiki/Aluminium_oxide ; pp. 1-5; 2014.*

(Continued)

*Primary Examiner* — Binh X Tran (57) ABSTRACT

The present invention relates to a method for preserving a mark on a metallic workpiece prior to a chemical etching process to remove a surface material from a surface of the workpiece carrying the mark, the method comprising the steps of: deepening the mark relative to the surface to form a first depth; and depositing a filling material into the first depth, wherein the filling material is adapted to be removed during the chemical process, such that a second depth is obtained at the mark after the chemical process. The present invention also relates to a method of treating a metallic workpiece to preserve a mark on the surface of the workpiece, the method comprising the step of treating at least a portion of the surface of the workpiece surrounding the mark to remove at least a surface oxide layer from the mark, the treating step being arranged such that it does not remove all of the surface material from said portion of the surface of the workpiece, but removes at least the surface oxide layer from the mark.

15 Claims, 8 Drawing Sheets

(51) Int. Cl.
| | |
|---|---|
| *B23K 26/00* | (2014.01) |
| *C25D 5/02* | (2006.01) |
| *C25D 5/06* | (2006.01) |
| *C25D 5/48* | (2006.01) |
| *C25D 11/18* | (2006.01) |
| *C25D 11/24* | (2006.01) |
| *C23C 18/54* | (2006.01) |
| *C23F 1/02* | (2006.01) |
| *B23K 26/352* | (2014.01) |
| *B23K 101/34* | (2006.01) |
| *B23K 101/36* | (2006.01) |
| *B23K 103/10* | (2006.01) |

(52) U.S. Cl.
CPC ............ *B23K 26/352* (2015.10); *C23C 18/54* (2013.01); *C23F 1/02* (2013.01); *C25D 5/02* (2013.01); *C25D 5/06* (2013.01); *C25D 5/48* (2013.01); *C25D 11/18* (2013.01); *C25D 11/24* (2013.01); *B23K 2201/34* (2013.01); *B23K 2201/35* (2015.10); *B23K 2201/36* (2013.01); *B23K 2203/10* (2013.01); *B44C 1/227* (2013.01)

(58) Field of Classification Search
USPC .................................... 216/28, 32, 39, 56, 94
See application file for complete search history.

(56) References Cited

U.S. PATENT DOCUMENTS

| | | | | |
|---|---|---|---|---|
| 2009/0194914 | A1* | 8/2009 | Uozu | ..................... B29C 33/38 264/496 |
| 2011/0017602 | A1* | 1/2011 | Khosla | ..................... C25D 5/02 205/50 |
| 2012/0318772 | A1* | 12/2012 | Minoura | ................ C25D 11/12 216/52 |
| 2014/0363658 | A1* | 12/2014 | Sun | ........................ C25D 11/24 428/307.3 |
| 2017/0028591 | A1* | 2/2017 | Nakahara | ................ B29C 33/38 |

FOREIGN PATENT DOCUMENTS

| | | |
|---|---|---|
| JP | H07138783 A | 5/1995 |
| JP | 2003211898 A | 7/2003 |

OTHER PUBLICATIONS

Wikipedia, "Nickel sulfate" via https://web.archive.org/web/20130629201625/https://en.wikipedia.org/wiki/Nickel(II)_sulfate ; pp. 1-5, 2013.*

United Kingdom Intellectual Property Office (UKIPO), UKIPO Search Report for United Kingdom patent application 1518499.7, Jun. 8, 2016, p. 1, UKIPO, United Kingdom.

* cited by examiner

METHOD FOR PRESERVING A MARK ON A METALLIC WORKPIECE

FIELD OF THE INVENTION

The invention relates to a method for preserving a mark on a metallic workpiece, particularly but not exclusively, to a method for preserving a mark on a metallic workpiece which will be processed by a chemical surface processing step.

BACKGROUND OF THE INVENTION

A number of chemical methods have been conventionally applied to etch, clean or generally, process surfaces of a metallic workpiece for a clear and consistent finish or aesthetically enhanced appearance. For example, workpieces of aluminium and/or aluminium alloys are often surface processed by etching in an aqueous sodium hydroxide solution (NaOH (aq)) (also called "caustic solution" or "caustic soda") to remove the surface material prior to anodization. This etching step will generally produce a basic surface finish which prepares the workpiece for the subsequent, anodizing steps.

One issue of the caustic surface processing is that the chemical etching involved is a non-selective process and therefore, any markings such as signs, logos or indicia which have been previously provided on the surface of the workpiece, will also be removed along with the surface material of the workpiece and therefore the markings are not retained.

OBJECTS OF THE INVENTION

An object of the present invention is to provide a method for surface processing a metallic workpiece, in which the aforesaid shortcoming is mitigated or obviated to some degree or at least to provide a useful alternative.

Another object of the present invention is to mitigate or obviate to some degree one or more problems associated with known surface processing methods for metallic workpieces.

The above objects are met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a method for preserving a mark on a metallic workpiece prior to a chemical process to remove a surface material from a surface of the workpiece carrying the mark, the method comprising the steps of: deepening the mark relative to the surface to form a first depth; and depositing a filling material into the first depth, wherein the filling material is adapted to be removed during the chemical process, such that a second depth is obtained at the mark after the chemical process.

Preferably, the mark on the metallic workpiece comprises an etch or anneal mark and the chemical process is a chemical etching process.

Preferably, the step of deepening the mark relative to the surface to form a first depth comprises reacting a surface of the mark with an acidic solution.

Preferably, the filling material is a metallic material.

Preferably, the metallic filling material is a different metallic material to that of the workpiece.

Preferably, the step of depositing the filling material comprises an electrochemical reaction in the presence of a metal ion-containing electrolyte solution at the first depth of the mark.

Preferably, the chemical process comprises etching with an alkaline solution.

Preferably, the surface of the workpiece is anodized.

Preferably, the chemical process comprises removing at least an oxide layer from the surface material of the workpiece.

Preferably, the method further comprising a step of treating the surface of the workpiece carrying the mark prior to the step of deepening the mark relative to the surface to form a first depth.

Preferably, the treating step comprises removing at least a surface oxide layer from the mark.

Preferably, the treating step is applied to at least a portion of the surface of the work piece surrounding the mark, but is such that it does not remove all of the surface material from said portion of the surface of the workpiece, but removes at least the surface oxide layer from the mark.

Preferably, the treating step comprises laser treatment of the portion of the surface.

Preferably, the power of the laser is set such that it does not remove all of the surface material from said portion of the surface of the workpiece, but removes at least the surface oxide layer from the mark.

Preferably, the treating step is applied to a whole of the surface of the workpiece carrying the mark.

Preferably, the steps of deepening the mark relative to the surface to form a first depth and depositing the filling material into the first depth is conducted substantially simultaneously under an electrochemical reaction between an acidic, metal ion-containing electrolyte solution and a material at the mark.

Preferably, the material at the mark is dissolved by the acidic electrolyte solution to generate the first depth prior to the disposition of the filing material into the first depth.

Preferably, the workpiece comprises a first thickness prior to the chemical process, wherein the first depth and the first thickness are of a ratio ranged from 0.05:0.5 to 0.07:10.

Preferably, the workpiece comprises a second thickness after the chemical process, wherein the second depth and the second thickness are of a ratio ranged from 0.07:0.3 to 0.1:9.8.

Preferably, the mark carried by the surface of the workpiece comprises any one or any combination of numerals, characters, signs, logos, or pictures.

In a second main aspect, the invention provides a method of treating a metallic workpiece to preserve a mark on the surface of the workpiece, the method comprising the step of: treating at least a portion of the surface of the work piece surrounding the mark to remove at least a surface oxide layer from the mark, the treating step being arranged such that it does not remove all of the surface material from said portion of the surface of the workpiece, but removes at least the surface oxide layer from the mark.

Preferably, the treating step comprises laser treatment of the portion of the surface.

Preferably, the power of the laser is set such that it does not remove all of the surface material from said portion of the surface of the workpiece, but removes at least the surface oxide layer from the mark.

Preferably, the treating step is applied to a whole of the surface of the workpiece carrying the mark.

Preferably, the mark carried by the surface of the workpiece comprises any one or any combination of numerals, characters, signs, logos, or pictures.

In a third main aspect, the invention provides a method of selectively generating a depth at an etch or anneal mark of an anodized metallic workpiece, comprising: treating a surface of the workpiece carrying the etch or anneal mark to remove at least a surface oxide layer from the etch or anneal mark; and reacting a material of the etch or anneal mark with an acidic solution to deepen the etch or anneal mark.

Preferably, the treating step comprises laser treatment of the surface.

Preferably, the treating step being arranged such that it does not remove all surface material from said surface of the workpiece, but removes at least the surface oxide layer from the etch or anneal mark.

Preferably, the reacting step comprises an electrochemical reaction between an acidic, metal ion-containing electrolyte solution and a material at the etch mark.

Preferably, the material at the etch mark is dissolved by the acidic electrolyte solution to generate the depth at the etch mark.

Preferably, the reacting step is performed on a portion of the surface of the workpiece surrounding the etch mark.

Preferably, the etch or anneal mark carried by the surface of the workpiece comprises any one or any combination of numerals, characters, signs, logos, or pictures.

In a fourth main aspect, the invention provides a method of selectively depositing a filling material into a depth provided at a mark formed in an anodized metallic workpiece, comprising the step of: reacting a metal ion-containing electrolyte solution at the depth during an electrochemical reaction.

Preferably, the electrochemical reaction simultaneously removes a material from the depth to thereby increase magnitude of the depth while depositing the filing material into the depth.

Preferably, the metal ion-containing electrolyte solution is acidic.

Preferably, the filling material is adapted to be removed from the workpiece during a subsequent chemical etching process on the workpiece.

Preferably, the depositing step is conducted by applying the electrolyte solution selectively at the depth by a conducting tool connected to an anode of a power supply during the electrochemical reaction.

Preferably, the workpiece is connected to a cathode of the power supply during the electrochemical reaction.

Preferably, the mark carried by the surface of the workpiece comprises any one or any combination of numerals, characters, signs, logos, or pictures.

In a fifth main aspect, the invention provides a method of selectively removing at least an oxide layer from an anodized metallic workpiece, the workpiece comprising at least one first region and at least one second region, wherein the first region is physically and/or chemically weaker than the second region, the method comprising the step of: laser treating the workpiece to thereby remove at least a surface oxide layer from the first region without removing all of a surface material layer of the second region.

In a sixth main aspect, the a method for preserving a mark carried by a surface of a metallic workpiece, the method comprising the steps of: deepening the mark relative to the surface; and treating at least a portion of the work piece surrounding said mark to remove the surface material from said portion of the work piece without removing the mark.

In a seventh main aspect, there is provided a workpiece produced by any of the methods according to the invention.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the claims hereof, any element expressed as a means for performing a specified function is intended to encompass any way of performing that function. The invention as defined by such claims resides in the fact that the functionalities provided by the various recited means are combined and brought together in the manner which the claims call for. It is thus regarded that any means that can provide those functionalities are equivalent to those shown herein.

The present invention relates to a method for preserving one or more marks on a metallic workpiece. Particularly, the invention relates to a method for preserving one or more marks on a metallic workpiece prior to a chemical process to remove a surface material from a surface of the workpiece carrying the marks, which would otherwise be removed by the chemical process.

During a refurbishing process for a metallic workpiece which normally requires one or more surface processing steps, an etching solution such as caustic soda can be used to remove the surface materials such as the surface oxide layer covering the substrate and/or at least some of the substrate materials of the workpiece so as to provide a "clean" surface for the subsequent surface finishing steps. Caustic etching is a non-selective chemical process and accordingly, any markings such as signs or logos which are previously introduced to the surface of the workpiece will also be removed along with the other surface materials of the workpiece. However, in many circumstances it is desirable for these markings to be retained so that the original appearance of the workpiece can be well restored after the refurbishment.

In one embodiment of the present invention, there is provided a method for preserving a mark such as, for example, an etch or anneal mark on a metallic workpiece prior to a chemical process such as, for example, a chemical etching process to remove a surface material from a surface of the workpiece carrying the mark. The method comprises the steps of deepening the mark relative to the surface to form a first depth; and depositing a filling material into the first depth, wherein the filling material is adapted to be removed during the chemical etching process, such that a second depth is obtained at the mark after the chemical process. Particularly, the second depth is of a sufficient distance from the surface such that the mark can be substantially retained on the surface of the workpiece even after further surface finishing steps of the workpiece such as, but not limiting to, surface polishing, blasting, buffering and/or anodizing, etc.

Figure 1:
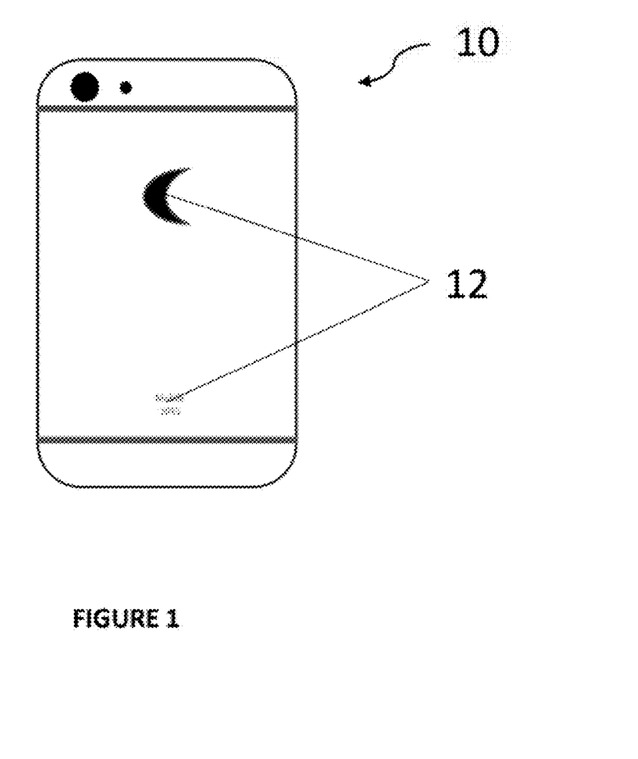
FIG. 1 is a schematic diagram showing a front view of an anodized metallic workpiece in the form of a housing of a portable electronic device.
Figure 2:
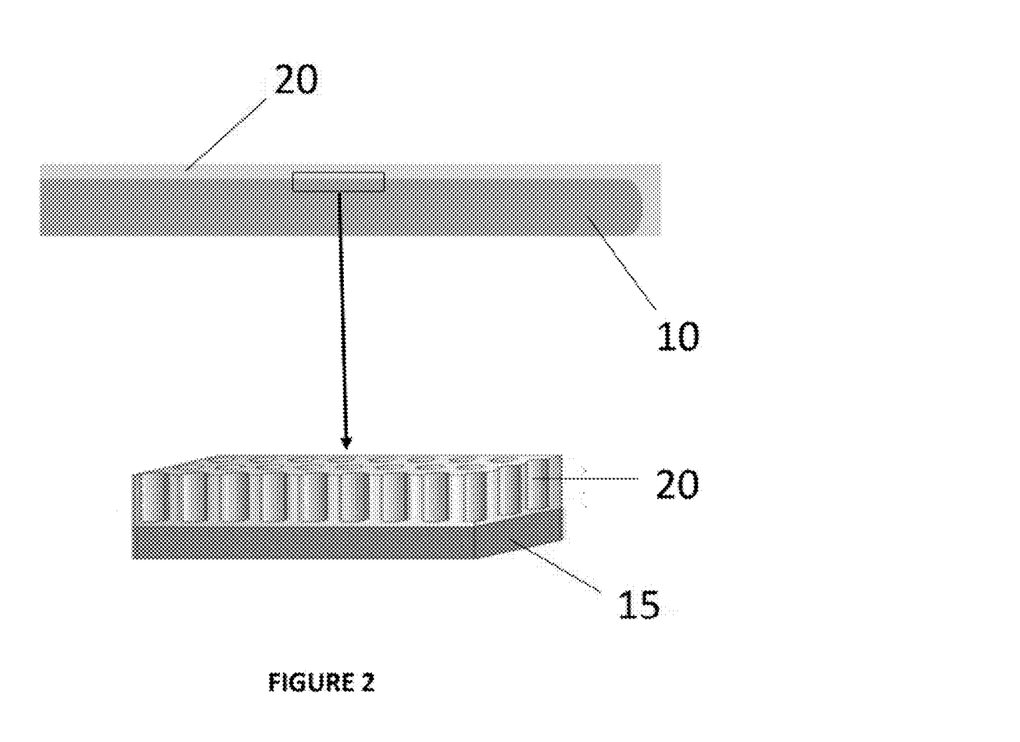
FIG. 2 is a side view of the workpiece of FIG. 1 showing an upper oxide layer and a metallic substrate layer.

Referring to FIGS. 1 and 2, shown is a metallic workpiece 10 in the form of a housing for a portable electronic device such as a mobile phone, a tablet PC or the like. In one embodiment, the workpiece 10 can be composed of one or more metal or metal compounds such as, but not limited to, aluminum metal and/or aluminum alloys (hereinafter referred to as "aluminum"). In one further embodiment, the aluminum workpiece 10 can be anodized, i.e. one or more surfaces of the workpiece 10 have been coated with an oxide layer 20, or have increased thickness of the natural oxide layer on the surface 15 of the workpiece 10. Anodization can be conducted by any known electrolytic processes, with the resulting oxide layer capable of improving resistance to corrosion and wear of the workpiece 10 and also facilitating the subsequent surface finishing procedures for the workpiece 10.

It is not uncommon for the surface of the housing 10 of a portable electronic device to be provided with markings 12 such as one or more of a numeral, character, sign, logo, picture and their combinations which indicates information of the device such as its brand name or model number etc. These markings 12 can be introduced to the surface of the housing by any etching or annealing means such as chemical etching, photo-annealing, electromagnetic beam annealing and/or physical engraving, etc. Experience shows that different processes of etching or annealing may impose different degrees of adverse effects on the physical and/or chemical properties of the surface material of the workpiece 10.

Figure 3:
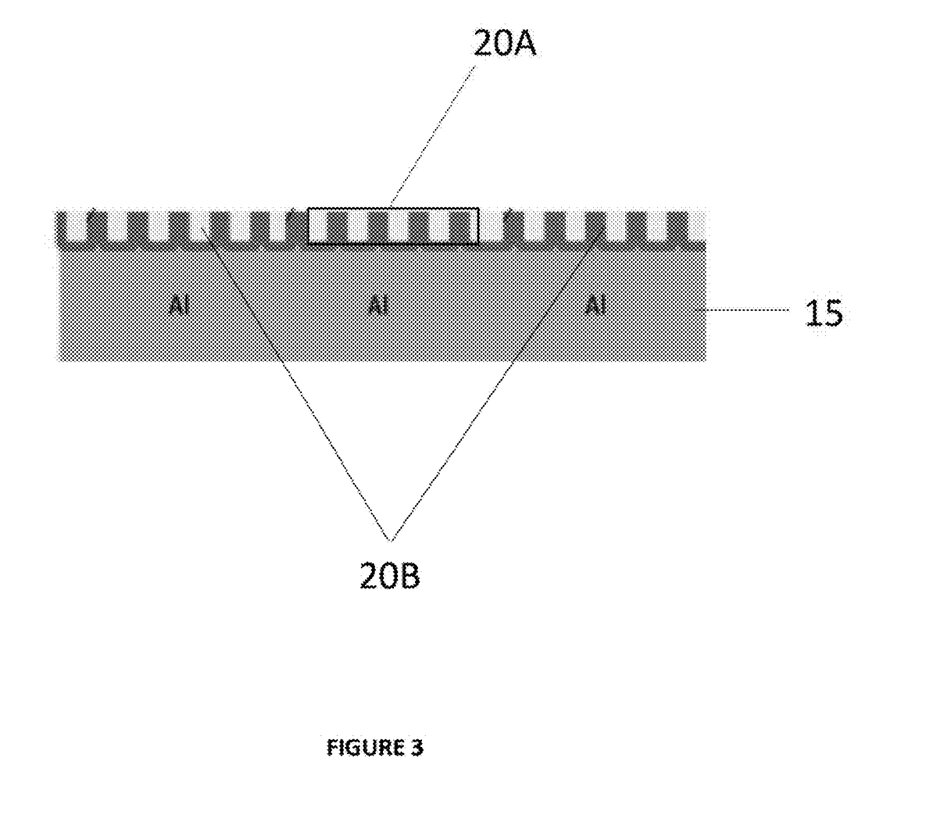
FIG. 3 is a schematic cross-sectional diagram showing the "weakened" oxide layer at a region of the surface of the workpiece where a mark is located.

For example, surface material of an etch or anneal mark 12 may generally comprise a surface oxide layer 20A which is substantially "weaker" than the surface oxide layer 20B of the other, non-etch mark regions of the surface of the workpiece 10, as shown in FIG. 3.

Figure 4:
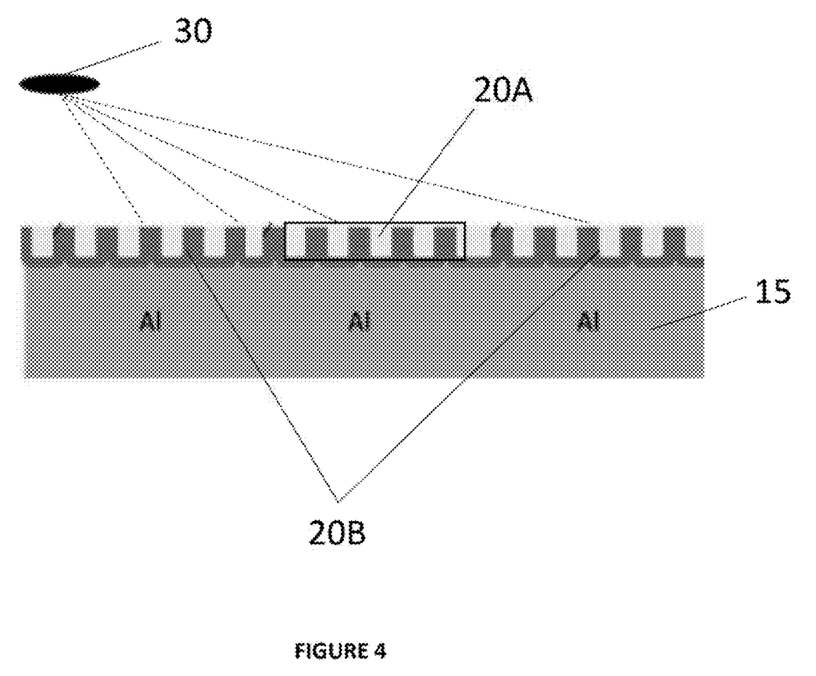
FIG. 4 is a schematic diagram showing a laser treatment process on the surface of the metallic workpiece carrying the mark as indicated in FIG. 3.
Figure 5:
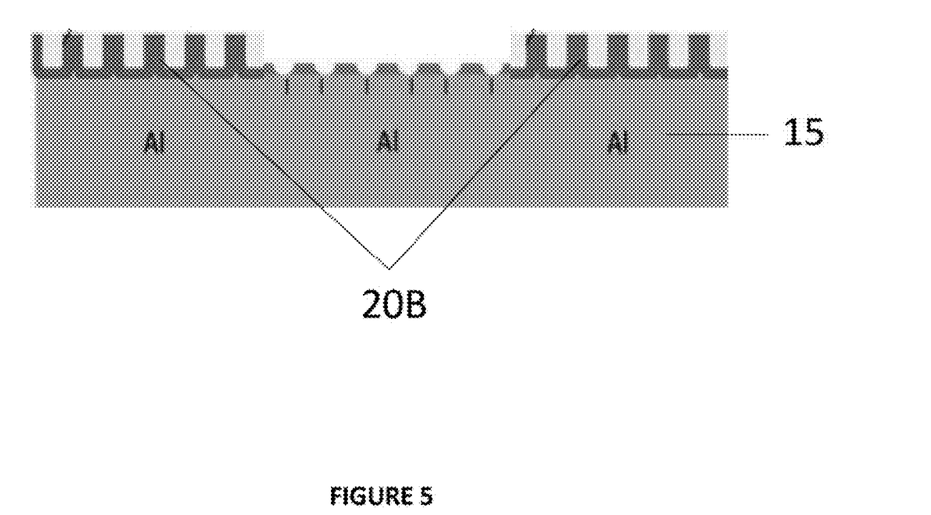
FIG. 5 is a schematic diagram showing the surface of the metallic workpiece after the laser treatment of FIG. 4.

In one embodiment, it is provided a step of treating at least a portion of the surface of the workpiece 10 surrounding the mark 12 to thereby remove at least the weakened surface oxide layer 20A (FIG. 3) from the etch or anneal mark 12 prior to the step of deepening the mark 12 relative to the surface to form a first depth. As shown in FIG. 4, the treating step may involve a laser source 30 adapted to emit laser radiation to the portion of the surface of the workpiece 10 surrounding the mark 12 or to a whole of the surface of the workpiece, and the step is arranged such that the laser does not remove all of the surface material from said portion of the surface of the workpiece 10 including the region covered by the stronger oxide layer 20B, but does remove at least the weakened surface oxide layer 20A from the mark 12, as shown in FIG. 5. This selective removal of the surface oxide layer 20A is achieved by the difference in composition of the surface oxide layers 20A and 20B due to the previous etching or annealing action to form the original etch or anneal mark 12. As mentioned, etching or annealing substantially "weakens" the surface oxide layer by reducing the thickness and/or weakening the physical and/or chemical properties of the oxide layer, so that the weakened surface oxide layer 20A will be more susceptible to be removed by the laser treatment.

The laser treatment may comprise radiation from one or more of an infrared laser at a wavelength of 1064 nm, a green type laser at a wavelength of 532 nm for aluminum, $CO_2$ laser, and any other type of lasers which are applicable for this purpose. Particularly, the power of the laser 30 is set such that it does not remove all of the surface material from said portion of the surface of the workpiece 10, but removes at least the surface oxide layer 20A from the mark 12. In one embodiment, at least one of the parameters such as power, frequency, velocity, distance from the sample material and duration of radiation of the laser 30 can be controlled such that the surface oxide layer 20A and optionally, a portion of the aluminum at the etch mark 12 is removed by the laser treatment. For example, an infrared laser (brand: SEI laser, model: G8 Laser$^3$) operated at a power of about 60%, a frequency of about 40 KHz and a velocity of about 3000 mm/s, with the tip of the laser beam positioned at about 170 mm from the surface of the sample workpiece would be sufficient to remove the surface oxide layer 20A from the workpiece 15 without removing all of the surface oxide layer 20B from the surface of the workpiece 15.

The step of laser treating the surface of the workpiece 15 to remove the surface oxide layer 20A is followed by the step of deepening the mark 12 relative to the surface of the workpiece 12 to form a first depth 40. Specifically, the step of deepening comprises reacting the material of the mark 12, with its protective surface oxide layer 20A removed during the prior laser treatment step, with an acidic solution. The mechanism to remove the metal or metal compound by an acidic solution is based on the Reduction-Oxidation (Redox) reaction between the metal and acid, with a consequence that a certain amount of the substrate metal materials at the mark 12 being dissolved to form a first depth 40. Preferably, the acidic solution is selectively applied on the surface at and surround the mark 12 to selectively generate a depth at the specific region of the etch mark 12. The depth of the first depth 40 can be dependent on, for example, at least one of the reactivity of the metal substrate, the strength of the acid, and the duration of the redox reaction. In one embodiment, by applying an acidic ferric chloride solution on and around the aluminum surface of the unprotected mark 12 for about 30 s to 60 s would generate a depth of about 0.04 mm to 0.07 mm. In yet a further embodiment, the first depth 40 and the thickness of the workpiece 10 (assuming having a substantially uniform thickness) prior to the caustic etching process can be of a ratio ranged from 0.05:0.5 to 0.07:10. Particularly, it is preferred to limit the reaction time to about and less than 60 s as it is observed that reaction between the metal surface and the acid for more than 90 s would affect not only the unprotected metal substrate, but also the other adjacent regions even if they are protected by the surface oxide layer, which will result in a deformation of the mark 12.

After a first depth 40 is formed at the mark 12 by the acid treatment, the next step is to deposit a filling material into the first depth 40. Preferably, the filling material comprises one or more metallic materials including pure metals, metal alloys and/or metal compounds. More preferably, the filling metallic material is different to the metallic material of the workpiece 12. The filling material is adapted to be removed during the subsequent caustic etching process, such that a second depth 60 can be obtained at the mark 12 after the etching process. Preferably, the filling material is adapted to be removed preferentially when compared to the other materials of the workpiece 10 during the caustic etching process.

It is understandable that the second depth 60 would be of a magnitude equal to or more than that of the first depth 40, which is due to the subsequent caustic etching of the material underneath the filling material and the succeeding surface finishing steps which remove the surface materials of the workpiece 10. In one embodiment, the second depth 60 and the thickness of the workpiece 10 (assuming having a substantially uniform thickness) after the caustic etching process can be of a ratio ranged from 0.07:0.3 to 0.1:9.8.

Specifically, the step of depositing the filling metallic material into the first depth 40 comprises an electrochemical reaction in the presence of a metal ion-containing electrolyte solution at the first depth 40 of the mark 12 during a metal substitution process. In one embodiment, the steps of deepening of the mark 12 to form the first depth 40 and depositing the filling material into the first depth 40 can be conducted substantially simultaneously under an electrochemical reaction between an acidic, metal ion-containing electrolyte solution and a material at the mark 12, with the material at the mark 12 being dissolved by the acidity of the electrolyte solution to generate the first depth 40 prior to the disposition of the filing material into the first depth 40 during the electrochemical, metal substitution process. In a further embodiment, the electrochemical reaction may simultaneously remove a material from the depth 40 to thereby increase magnitude of the depth while depositing the filling material into the depth.

Figure 6:
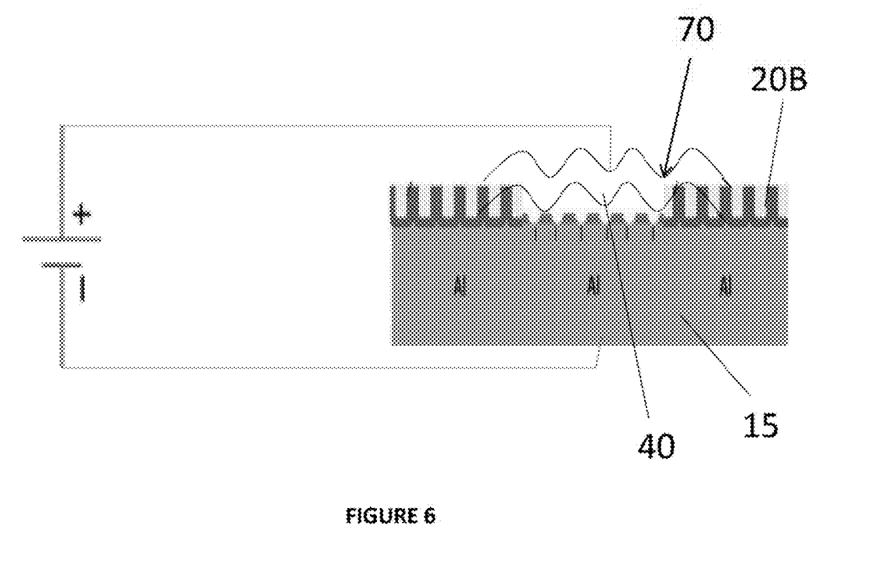
FIG. 6 is a schematic diagram showing an electrochemical reaction conducted at the location of the mark after the oxide layer is removed after the laser treatment of FIG. 4.
Figure 7:
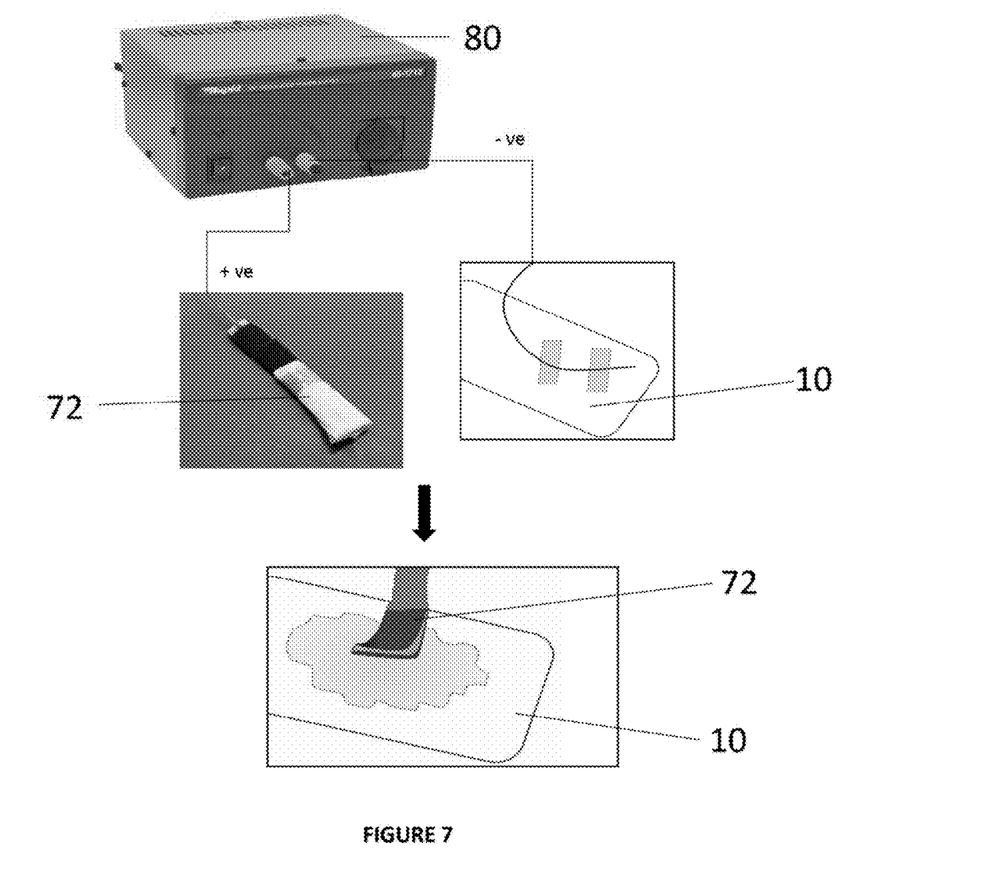
FIG. 7 shows the relevant set up and steps to conduct the electrochemical reaction of FIG. 6.
Figure 8:
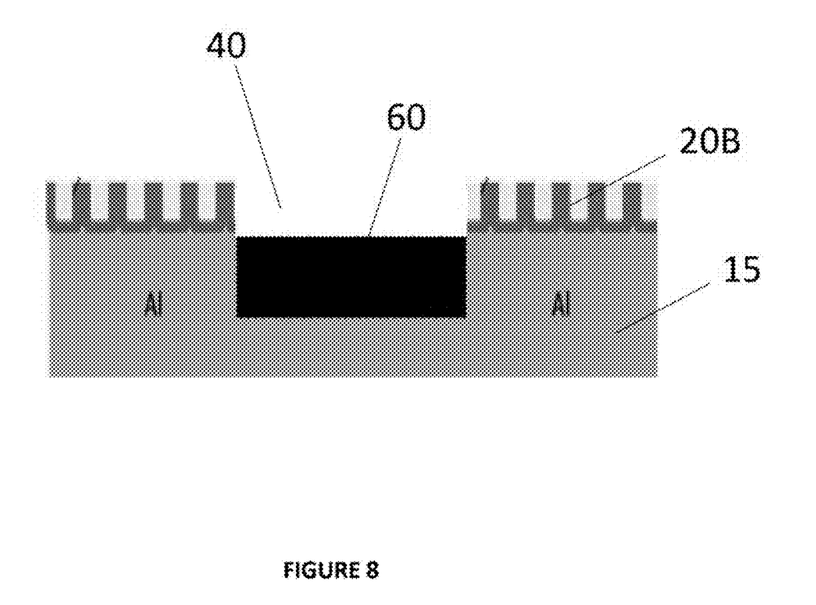
FIG. 8 is a schematic diagram showing a metallic material deposited at the mark after the electrochemical reaction of FIGS. 6 and 7.

An embodied setup of the described processes is illustrated in FIGS. 6 to 7. As shown in the figures, an acidic, metal ion-containing electrolyte solution 70 such as aqueous ferric chloride solution ($FeCl_3$ (aq)) is applied selectively on a portion of the surface at and surround the etch mark 12, with the etch mark 12 being previously treated with laser to remove the surface oxide layer 20A. In one embodiment, the selective application of the $FeCl_3$ (aq) to the specific region of mark 12 can be conducted by a typical brush electroplating arrangement. Specifically, the brush 72, generally an anode wrapped with a cloth material saturated with the plating, electrolyte solution 70, is connected to the positive terminal of a low voltage direct-current power source 80, and that the workpiece 10 is connected to the cathode of the power source 80. To facilitate the electrochemical reaction, an operator may dip the brush 72 into the electrolyte solution 70 and then apply the solution at and surround the surface of the mark 12. This action evenly distributes the acidic electrolyte solution 70 on to the mark 12, so that the metallic substrate material at the mark can be continuously dissolved by the acid to thereby deepen the first depth 40. Simultaneously, the metal ions at the electrolyte can be continuously reduced to deposit the filling metallic material into the first depth 40. As mentioned earlier, the duration of the electrochemical reaction is preferred to be limited to no more than 60 s as it is observed that reaction for more than 90 s would affect also substantially the composition of surface regions other than the mark 12. FIG. 8 shows a schematic diagram of the first depth 40 being deposited with a filling metal material 60 after the electrochemical processes of FIGS. 6 and 7.

Although the use of aqueous ferric chloride solution has been described in the above electrochemical reaction, any metal ion-containing electrolyte solutions which are considered suitable and applicable for use in an electrochemical, metal substitution reaction at the metallic workpiece should also be encompassed. Examples of the preferred metal ions of the electrolyte include, but are not limited to, iron ions, copper ions, silver ions, aluminum ions, nickel ions and zinc ions. Example of the electrolyte may include, for example, zinc chloride solution, nickel (II) chloride solution, copper (II) chloride solution etc. Particularly, any electrolyte solutions which include metal ions which satisfy the "Hume-Rothery rules" (Foundations of Materials Science and Engineering, 4th ed., W. Smith and J. Hashemi, p. 139-140 (2006)) which describe the conditions to undergo a solid substitutional reaction, would be applicable.

After the deposition of the filling material 60 into the first depth 40, the workpiece 10 will be surface treated by caustic etching, for example, by submerging the workpiece 10 into a bath of alkaline, caustic solution. The filling material 60 at the mark 12 will be dissolved and removed at a faster rate than the surface materials of the anodized surface of the workpiece 10. By controlling the duration of the reaction, temperature of the reaction and/or strength (e.g. alkalinity) of the caustic solution, surface of the workpiece 10 can be etched at a controlled manner with at least the filling material 60 at the mark 12 be removed so as to retain the mark 12 after the chemical etching process.

Although only workpiece of aluminum is embodied in the above described examples, a person skilled in the art would appreciate that workpiece which comprises other metallic materials should also be encompassed, as long as they are considered suitable and applicable for the present invention.

Similarly, although alkaline, aqueous sodium hydroxide solution (NaOH (aq)) or caustic soda is embodied in the above described examples, a person skilled in the art would appreciate that any etching solution such as potassium hydroxide solution, calcium hydroxide solution, barium hydroxide solution etc. should also be encompassed, as long as they are considered suitable and applicable for the current purpose.

What is claimed is:
1. A method for preserving a mark on a surface of a metallic workpiece, the method comprising the steps of:
   deepening the mark relative to a metallic surface of the workpiece to form a first depth; and
   depositing a metallic filling material into the first depth;

wherein the steps of deepening the mark relative to the metallic surface of the workpiece to form a first depth and depositing the metallic filling material into the first depth are conducted simultaneously under an electrochemical reaction between an acidic, metal ion-containing electrolyte solution and a material at the mark; and wherein the metallic filling material is removed during a subsequent chemical process, such that a second depth is obtained at the mark after the chemical process.

2. The method according to claim 1, wherein the mark on the metallic workpiece comprises an etch or anneal mark and the chemical process is a chemical etching process.

3. The method according to claim 1, wherein the step of deepening the mark relative to the metallic surface of the workpiece to form the first depth comprises reacting a surface of the mark with an acidic solution.

4. The method according to claim 1, wherein the metallic filling material is a different metallic material to that of the workpiece.

5. The method according to claim 1, wherein the chemical process comprises etching with an alkaline solution.

6. The method according to claim 1, wherein the surface of the workpiece is anodized.

7. The method according to claim 1, wherein the chemical process comprises removing at least an oxide layer from the surface of the workpiece.

8. The method according to claim 1, further comprising a step of treating the surface of the workpiece carrying the mark prior to the step of deepening the mark to form a first depth.

9. The method according to claim 8, wherein the treating step comprises removing at least a surface oxide layer from the mark.

10. The method according to claim 9, wherein the treating step is applied to at least a portion of the surface of the workpiece surrounding the mark, but is such that it does not remove all of the surface material from said portion of the surface of the workpiece, but removes at least the surface oxide layer from the mark.

11. The method according to claim 10, wherein the treating step comprises laser treatment of the portion of the surface.

12. The method according to claim 11, wherein the power of the laser is set such that it does not remove all of the surface material from said portion of the surface of the workpiece, but removes at least the surface oxide layer from the mark.

13. A method of selectively generating a depth at an etch mark of an anodized metallic workpiece, comprising:
   treating a surface of the workpiece carrying the etch mark to remove at least a surface oxide layer from the etch mark;
   reacting a material of the etch mark with an acidic, metal ion-containing electrolyte solution after removal of at least the surface oxide layer by the treating step to generate a first depth at a metallic surface of the workpiece; and
   depositing a metallic filling material into the first depth; and
   removing the metallic filling material to form a second depth;
   wherein the reacting step and the depositing step comprise an electrochemical reaction between the acidic, metal ion-containing electrolyte solution and a material at the etch mark.

14. The method according to claim 13, wherein the treating step comprises laser treatment of the surface.

15. The method according to claim 13, wherein the treating step being arranged such that it does not remove all surface material from said surface of the workpiece, but removes at least the surface oxide layer from the etch mark.

* * * * *

UNITED STATES PATENT AND TRADEMARK OFFICE
CERTIFICATE OF CORRECTION

PATENT NO. : 10,060,037 B2
APPLICATION NO. : 15/137935
DATED : August 28, 2018
INVENTOR(S) : Reybert L. Trinidad, Jose Mari I. Ombi-On and Orville T. Padaon It is certified that error appears in the above-identified patent and that said Letters Patent is hereby corrected as shown below:

On the Title Page

The item (72) inventor Jose Mari I. OMBI-ON correct last name is "OMBI-ON" (not "OMNI-ON").

Signed and Sealed this
Second Day of April, 2019

Andrei Iancu
*Director of the United States Patent and Trademark Office*